United States Patent
Kozma et al.

(10) Patent No.: US 10,708,055 B2
(45) Date of Patent: *Jul. 7, 2020

(54) SINGLE-INPUT MULTIFACTOR AUTHENTICATION

(71) Applicant: International Business Machines Corporation, Armonk, NY (US)

(72) Inventors: Gabriel M. Kozma, São Paulo (BR); Carlos E. Seo, São Paulo (BR)

(73) Assignee: International Business Machines Corporation, Armonk, NY (US)

(*) Notice: Subject to any disclaimer, the term of this patent is extended or adjusted under 35 U.S.C. 154(b) by 4 days.

This patent is subject to a terminal disclaimer.

(21) Appl. No.: 15/790,294

(22) Filed: Oct. 23, 2017

(65) Prior Publication Data

US 2018/0375658 A1 Dec. 27, 2018

Related U.S. Application Data

(63) Continuation of application No. 15/631,439, filed on Jun. 23, 2017.

(51) Int. Cl.
*H04L 9/32* (2006.01)
*G06F 21/62* (2013.01)
(Continued)

(52) U.S. Cl.
CPC ............ *H04L 9/3213* (2013.01); *G06F 21/32* (2013.01); *G06F 21/33* (2013.01); *G06F 21/34* (2013.01);
(Continued)

(58) Field of Classification Search
CPC . H04L 63/08; H04L 63/0807; H04L 63/0815; H04L 63/102; H04L 63/083;
(Continued)

(56) References Cited

U.S. PATENT DOCUMENTS

| 6,363,485 B1 | 3/2002 | Knapton, III |
| 6,580,814 B1 | 6/2003 | Ittycheriah |

(Continued)

FOREIGN PATENT DOCUMENTS

| EP | 2926290 A2 | 10/2015 |
| WO | 2003063411 A1 | 7/2003 |

OTHER PUBLICATIONS

"EMV and Encryption + Tokenization: A Layered Approach to Security" A First Data White Paper. Creation Date Jun. 1, 2012 at 6:03:01 PM. © 2012 First Data Corporation. Twelve pages.
(Continued)

*Primary Examiner* — Alexander Lagor
*Assistant Examiner* — Howard H. Louie
(74) *Attorney, Agent, or Firm* — Michael A. Petrocelli (57) ABSTRACT

Multifactor authentication is a method to secure data and accounts and to prevent unauthorized access. A first factor can be information that the user knows, such as a username and password combination. A second factor can be something that the user possesses, such as a token generator or a trusted device. The present invention enables a user to present multiple authentication factors through a single biometric input using stored credentials and tokens generated by a secure element.

8 Claims, 5 Drawing Sheets

(51) Int. Cl.
*H04W 12/06* (2009.01)
*G06F 21/33* (2013.01)
*G06F 21/32* (2013.01)
*H04L 29/06* (2006.01)
*G06F 21/34* (2013.01)

(52) U.S. Cl.
CPC ........ *G06F 21/6245* (2013.01); *H04L 9/3226* (2013.01); *H04L 9/3231* (2013.01); *H04L 9/3234* (2013.01); *H04L 63/083* (2013.01); *H04L 63/0861* (2013.01); *H04W 12/06* (2013.01); *H04L 2463/082* (2013.01)

(58) Field of Classification Search
CPC ... H04L 9/3213; H04L 9/3226; H04L 9/3231; H04L 9/3234; H04L 63/0861; H04L 2463/082; G06F 21/32; G06F 21/33; G06F 21/34; G06F 21/6245; H04W 12/06
See application file for complete search history.

(56) References Cited

U.S. PATENT DOCUMENTS

| | | | |
|---|---|---|---|
| 7,412,722 | B1 | 8/2008 | Norris |
| 8,554,689 | B2 | 10/2013 | Mardikar et al. |
| 9,053,304 | B2 | 6/2015 | Ronda et al. |
| 9,531,831 | B1* | 12/2016 | Cuadrat ............... H04L 67/303 |
| 10,157,328 | B2 | 12/2018 | Barreau |
| 2004/0073903 | A1 | 4/2004 | Melchione |
| 2005/0177750 | A1* | 8/2005 | Gasparini ............ G06F 21/31 726/5 |
| 2006/0095955 | A1* | 5/2006 | Vong .................. H04L 63/101 726/3 |
| 2006/0259492 | A1* | 11/2006 | Jun ..................... G06F 21/10 |
| 2007/0022301 | A1 | 1/2007 | Nicholson et al. |
| 2007/0130473 | A1* | 6/2007 | Mazotas ............. H04L 63/083 713/183 |
| 2007/0245152 | A1* | 10/2007 | Pizano ............... H04L 63/0861 713/186 |
| 2008/0244712 | A1* | 10/2008 | Kitada ................ G06F 21/41 726/5 |
| 2009/0183174 | A1* | 7/2009 | Subhraveti ........... G06F 9/4484 719/313 |
| 2010/0037303 | A1* | 2/2010 | Sharif .................. G06F 21/31 726/6 |
| 2012/0082348 | A1* | 4/2012 | Fukuda .............. G06K 9/00375 382/115 |
| 2013/0159710 | A1* | 6/2013 | Khan ................... H04L 63/062 713/168 |
| 2014/0219453 | A1* | 8/2014 | Neafsey ............... H04B 5/0056 380/270 |
| 2014/0289833 | A1* | 9/2014 | Briceno ................ H04L 63/08 726/7 |
| 2015/0089569 | A1 | 3/2015 | Sondhi |
| 2015/0312041 | A1 | 10/2015 | Choi |
| 2016/0036801 | A1* | 2/2016 | Caldwell ................ H04L 63/08 726/6 |
| 2016/0358172 | A1 | 12/2016 | Ziat |
| 2017/0264599 | A1 | 9/2017 | O'Regan et al. |
| 2018/0375657 | A1 | 12/2018 | Kozma |
| 2018/0375659 | A1 | 12/2018 | Kozma |

OTHER PUBLICATIONS

"IOS Security—White Paper" iOS9.3 or later May 2016. Sixty-three pages.

"What is a Secure Element?—Rambus" Thursday, May 22, 2014. <https://www.rambus.com/blogs/what-is-a-secure-element/>. Three pages.

Heilser "Apple Pay: An in-depth look at what's behind the secure payment system" Engadget Oct. 2, 2014. Nine pages. <https://www.engadget.com/2014/10/02/apple-pay-an-in-depth-look-at-whats-behind-the-secure-payment>.

Thorpe "Authy OneTouch—Modern Authentication for Any Application—Authy" Dated Oct. 28, 2015. <https://authy.com/blog/authy-onetouch-modern-authentication-for-any-application/>.

"The Smart Card Alliance is now the Secure Technology Alliance". Jun. 23, 2017. <https://www.securetechalliance.org/publications-nfc-frequently-asked-questions/>.

Appendix P List of IBM Patents or Applications Treated as Related Dated Oct. 23, 2017. Two pages.

Original U.S. Appl. No. 15/631,439, filed Jun. 23, 2017.

Appendix P List of IBM Patents or Applications Treated as Related. Dated Mar. 9, 2018. Two pages.

Kozma et al. Original U.S. Appl. No. 15/910,107, filed Mar. 2, 2018.

* cited by examiner

SINGLE-INPUT MULTIFACTOR AUTHENTICATION

BACKGROUND OF THE INVENTION

The present invention relates generally to the field of information security, and more particularly to multifactor authentication.

Data and accounts need to be protected from unauthorized access. Many accounts are secured with only a password. Other accounts use multifactor authentication, where the first factor is a password and the second factor is an additional token that must also be entered by the user at the time of login. The token is often provided to the user at the time of the login attempt, for example by text or email message, before the token is entered for authentication. It is known to use validation of a biometric symbol as a prerequisite to delivery of the second factor token to the user.

SUMMARY

According to an aspect of the present invention, there is a method that performs the following steps (not necessarily in the following order): (i) receiving, on a computing device, an authentication request from a requesting program associated with a user credential and a token seed for user authentication; (ii) retrieving the user credential from a secure storage on the computing device; (iii) generating, by the computing device, a token from the token seed responsive to the authentication request; and (iv) sending the user credential and the token to the requesting program.

According to an aspect of the present invention, there is a computer-implemented process for single-input two-factor authentication, the computer-implemented process comprising: initializing security data associated with a user including an account name, a user name, a password, an authentication token seed and a form of biometric identification including a fingerprint; storing the security data in a predetermined location only accessible by a kernel of a system, wherein the security data is passed from an application performing the initialization to the kernel via write-only methods using a predetermined security application programming interface, wherein a password keychain is stored encrypted in a device storage, fingerprint data and authentication tokens are stored in a secure element of a system on a chip; in response to a login request, requesting by the system an authentication token from predetermined security application programming interface; in response to the authentication token not being present, triggering, by the system, a login sequence of: prompting for a biometric ID, wherein the system permits a predetermined maximum N number of tries, after which failing to identify the user, the system using a predetermined conventional method requesting a user name and a password; in response to receiving a valid biometric ID by the system, accessing by the predetermined security application programming interface the password keychain and sending to an authentication service a user name and password pair; in response to credentials being incorrect, the system using the predetermined conventional method requesting a user name and a password; in response to a valid credential acknowledgement from the authentication service, accessing the secure element by the predetermined security application programming interface and sending a second-factor authentication token number; in response to the second-factor token number being incorrect, the system falling back to a traditional second-factor authentication method and prompting for the authentication token number; and in response to a valid second-factor token number, the system clearing the user for login and saving an authentication token in a predetermined secure location accessible by the predetermined security application programming interface for future use.

DETAILED DESCRIPTION

Multifactor authentication is a method to secure data and accounts and to prevent unauthorized access. A first factor may be information that the user knows, such as a username and password combination. A second factor may be something that the user possesses, such as a token generator or a trusted device. The present invention enables a user to present multiple authentication factors through a single biometric input using stored credentials and tokens generated by a secure element.

This Detailed Description section is divided into the following sub-sections: (i) The Hardware and Software Environment; (ii) Example Embodiment; (iii) Further Comments and/or Embodiments; and (iv) Definitions.

I. THE HARDWARE AND SOFTWARE ENVIRONMENT

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
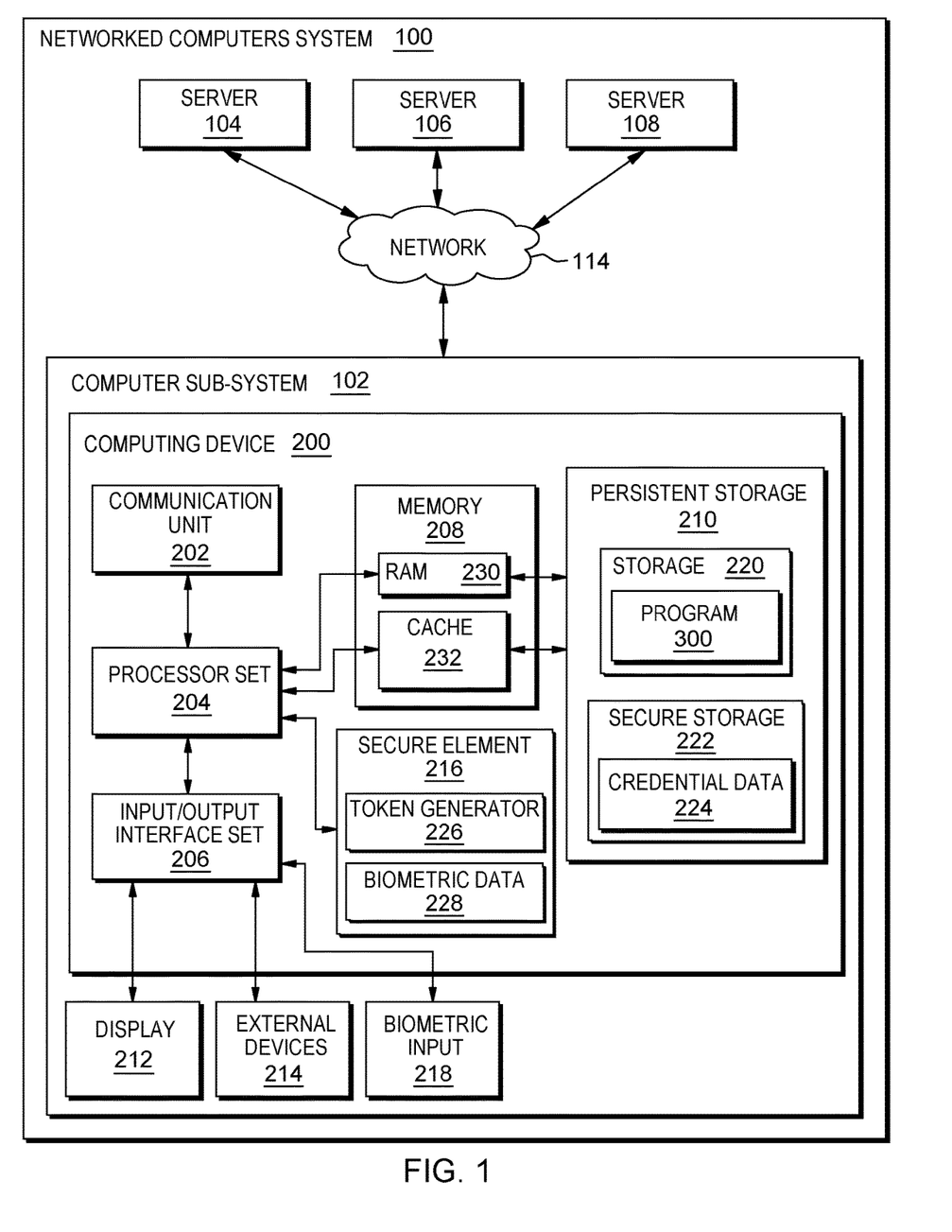
FIG. 1 is a block diagram view of a first embodiment of a system according to the present invention.

An embodiment of a possible hardware and software environment for software and/or methods according to the present invention will now be described in detail with reference to the Figures. FIG. 1 is a functional block diagram illustrating various portions of networked computers system 100, including: computing sub-system 102; server sub-systems 104, 106, 108; network 114; computing device 200; communication unit 202; processor set 204; input/output (I/O) interface set 206; memory device 208; persistent storage device 210; display device 212; external device set 214; secure element 216; biometric input device 218; storage 220; secure storage 222; credential data 224; token generator 226; biometric data 228; random access memory (RAM) 230; cache 232; and program 300.

Computing sub-system 102 is, in many respects, representative of the various computer sub-system(s) in the present invention. Accordingly, several portions of computing sub-system 102 will now be discussed in the following paragraphs.

Computing sub-system 102 may be a smart phone, mobile device, laptop computer, tablet computer, netbook computer, personal computer (PC), a desktop computer, a personal digital assistant (PDA), or any programmable electronic device capable of communicating with the client sub-systems via network 114. Program 300 is a collection of machine readable instructions and/or data that is used to create, manage and control certain software functions that will be discussed in detail, below, in the Example Embodiment sub-section of this Detailed Description section.

Computing sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Computing sub-system 102 is shown as a block diagram with many double arrows. These double arrows (no separate reference numerals) represent a communications fabric, which provides communications between various components of computing sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for computing sub-system 102; and/or (ii) devices external to computing sub-system 102 may be able to provide memory for computing sub-system 102.

Program 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210. In this embodiment, storage 220 and secure storage 222 are partitions of persistent storage 210. In this embodiment, program 300 is stored in storage 220. Secure storage 222 may be an encrypted partition of persistent storage 210. In this embodiment, secure storage 222 includes credential data 224. Credential data 224 represents stored credentials of the user. For example, credential data 224 may be an encrypted keychain, which stores a user name and password.

Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Secure element 216 is a secure component of computing device 200. Secure element 216 may be implemented as a system on a chip (SoC). Devices having the secure component for authentication purposes may be referred to herein as a "trusted device" or, simply, a "token generator" because it is the included token generator that gives the device the status of being trusted. In this particular embodiment, secure element is accessible only by an operating system kernel of computing device 200. Secure element 216 includes token generator 226 and biometric data 228. Token generator 226 generates tokens for use as the second factor in a two-factor authentication process. In this particular embodiment, token generator 226 is initialized with a token seed from a user. Biometric data 228 is stored data, which is used to authenticate biometric input from a user. In this particular embodiment, secure element 216 includes a persistent storage device (not shown) to store token generator 226, the token seeds, and biometric data 228, which is a separate storage device from persistent storage 210.

Communication unit 202, in these examples, provides for communications with other data processing systems or devices external to computing sub-system 102. In these examples, communication unit 202 includes one or more network interface cards. Communication unit 202 may provide communications through the use of either or both physical and wireless communications links. Any software modules discussed herein may be downloaded to a persistent storage device (such as persistent storage device 210) through a communication unit (such as communication unit 202).

I/O interface set 206 allows for input and output of data with other devices that may be connected locally in data communication with computing device 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. In these embodiments the relevant software may (or may not) be loaded, in whole or in part, onto persistent storage device 210 via I/O interface set 206. I/O interface set 206 also connects in data communication with display device 212. In this particular embodiment, biometric input device 218 is a fingerprint reader.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

II. EXAMPLE EMBODIMENT

Figure 3:
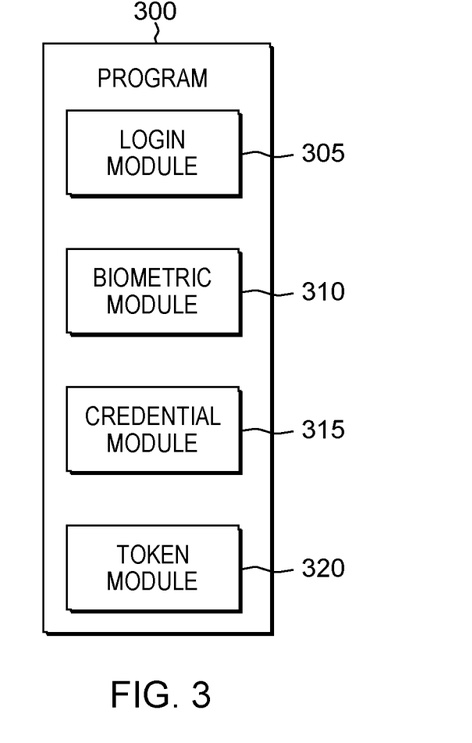
FIG. 3 is a block diagram view of a machine logic (for example, software) portion of the first embodiment system.

Program 300 operates to provide single-input login with multifactor authentication. Program 300 uses stored user credentials and an embedded secure element to provide multiple factors for authentication that can be accessed with a single biometric input from the user.

Figure 2:
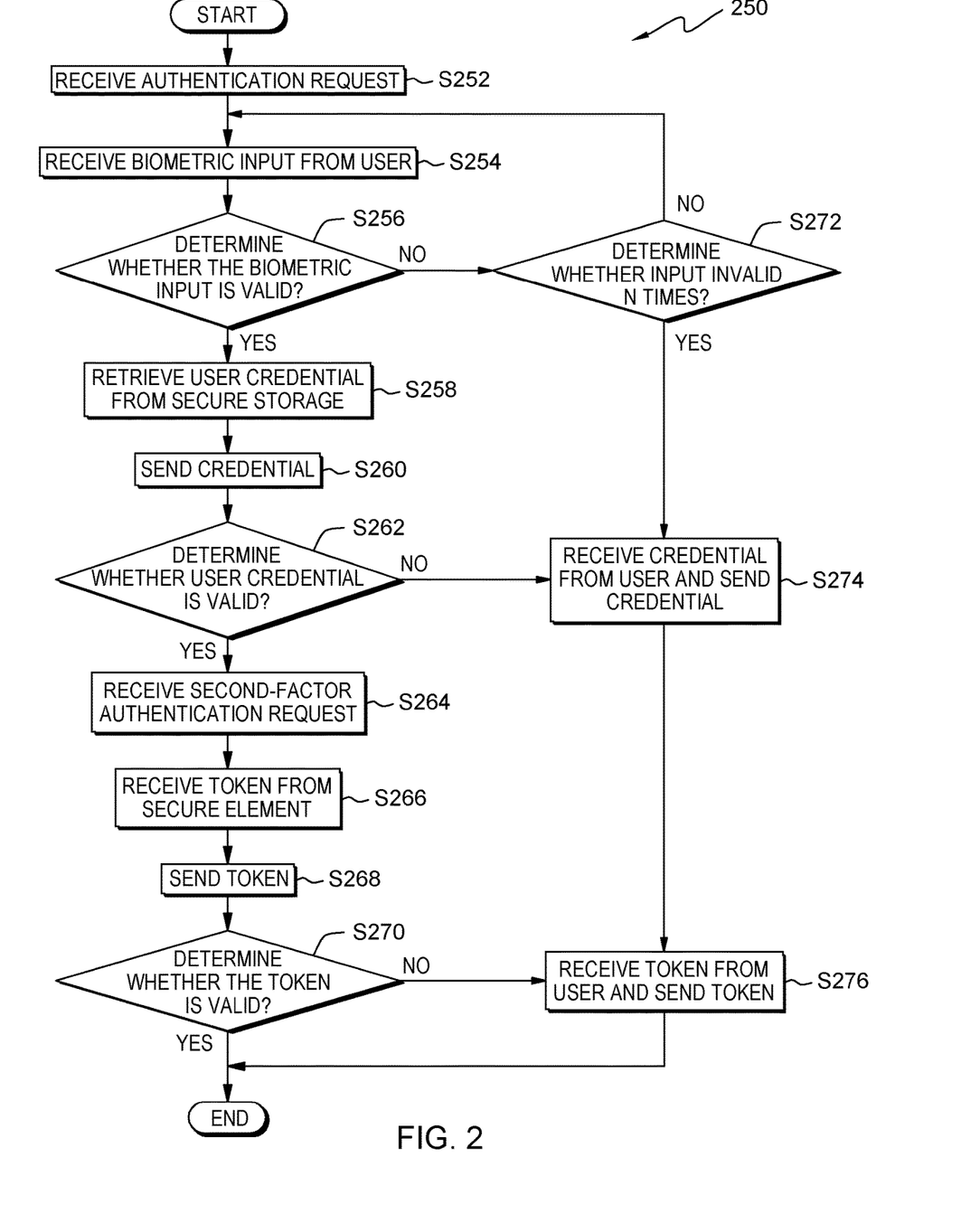
FIG. 2 is a flowchart showing a first embodiment method performed, at least in part, by the first embodiment system.

FIG. 2 shows flowchart 250 depicting a method according to the present invention. FIG. 3 shows program 300 for performing at least some of the method steps of flowchart 250. This method and associated software will now be discussed, over the course of the following paragraphs, with extensive reference to FIG. 2 (for the method step blocks) and FIG. 3 (for the software blocks).

Processing begin at step S252, where login module ("mod") 305 receives an authentication request. In this embodiment, login mod 305 receives an authentication request responsive to a user attempting to login to an application. For example, login mod 305 may receive an authentication request when the user attempts to login to a website.

Processing proceeds to step S254, where biometric mod 310 receives biometric input from the user. In this particular embodiment, biometric mod 310 receives a fingerprint scan of the user's finger via biometric input device 218. Alternatively, biometric mod may receive other biometric data, such as voice recognition, facial recognition, an iris scan, or a retinal scan. In some embodiments, biometric mod 310 may prompt the user for biometric input by, for example, displaying a message or link, playing an audio cue, or causing the computing device to vibrate.

Processing proceeds to step S256, where biometric mod 310 determines whether the biometric input is valid. In this embodiment, biometric mod 310 compares the biometric input received in step S254 to biometric data 228 to determine whether the biometric input matches biometric data 228. For example, biometric mod 310 may compare a fingerprint scan to fingerprint characteristics stored in biometric data 228.

Responsive to a determination that the biometric input is valid ("YES" branch, step S256), processing proceeds to step S258, where credential mod 315 retrieves a user credential from secure storage. In this particular embodiment, credential mod 315 retrieves a previously stored username and password combination, which corresponds to the application requiring authentication, from credential data 224 on secure storage 222.

Processing proceeds to step S260, where credential mod 315 sends the user credential to the application requiring authentication. In this particular embodiment, credential mod 315 enters the credential into text fields and sends the credential to the application. In this embodiment, the credential data is gathered by the kernel and sent; the credential data does not pass through the persistent or temporary data of the application.

Processing proceeds to step S262, where credential mod 315 determines whether the user credential is valid. In this particular embodiment, credential mod 315 presents the username and password to the application requiring a login, and credential mod 315 receives a response from the application determining whether the credential was valid. For example, credential mod 315 may submit the stored username and password to a website, and credential mod 315 may receive a valid credential acknowledgement from the website.

Responsive to a determination that the user credential is valid ("YES" branch, step S262), processing proceeds to step S264, where login mod 305 receives a second-factor authentication request. In this particular embodiment, responsive to a determination that the user credential is valid, login mod 305 receives a request for a token from the application requiring authentication.

Processing proceeds to step S266 where token mod 320 receives a token from the secure element. In this particular embodiment, token mod 320 receives a token from token generator 226 on secure element 216. In this embodiment, token generator 226 generates a single use token based on a previously stored token seed associated with the application requiring authentication.

Processing proceeds to step S268, where credential mod 315 sends the token to the application requiring authentication. In this particular embodiment, credential mod 315 enters the token into a text field and sends the token to the application. In this embodiment, the token is gathered by the kernel and sent; the credential data does not pass through the persistent or temporary data of the application.

Processing proceeds to step S270, where token mod 320 determines whether the token is valid. In this particular embodiment, token mod 320 presents the token to the application requiring a login, and token mod 320 receives a response from the application determining whether the login was successful.

Responsive to a determination that the biometric input is not valid ("NO" branch, step 256), processing proceeds to step S272, where biometric mod 310 determines whether the biometric input was invalid N times. In this particular embodiment, biometric mod 310 determines whether an invalid biometric input was received a predetermined number of times. For example, responsive to a first invalid biometric input, biometric mod 310 may determine that a biometric input has not been received a predetermined three times.

Responsive to a determination that the biometric input was not invalid N times ("NO" branch, step S272), processing proceeds to step S254, as described above.

Responsive to a determination that the user credential is not valid ("NO" branch S262) or responsive to a determination that the biometric input was invalid N times ("YES" branch, step S272), processing proceeds to step S274, where credential mod 315 receives a credential from the user and sends the credential to the application requiring a login. In this particular embodiment, credential mod 315 receives a credential from user input, and credential mod 315 presents the credential to the application requiring a login. For example, credential mod 315 may receive a user-input username and password, which credential mod 315 presents to the application.

Responsive to a determination that the token is not valid ("NO" branch, S270) or responsive to receiving a credential from the user and sending the credential to the application requiring a login (S274), processing proceeds to step S276, where token mod 320 receives a token from a user and sends the token to the application requiring a login. In this particular embodiment, token mod 320 receives user input containing the token.

III. FURTHER COMMENTS AND/OR EMBODIMENTS

Some embodiments of the present invention recognize the following facts, potential problems and/or potential areas for improvement with respect to the current state of the art: (i) multifactor authentication using an authentication token application or a SMS message is cumbersome for users; and/or (ii) users must type a password, receive a second-factor authentication token, and type the token to login to their accounts.

Figure 4:
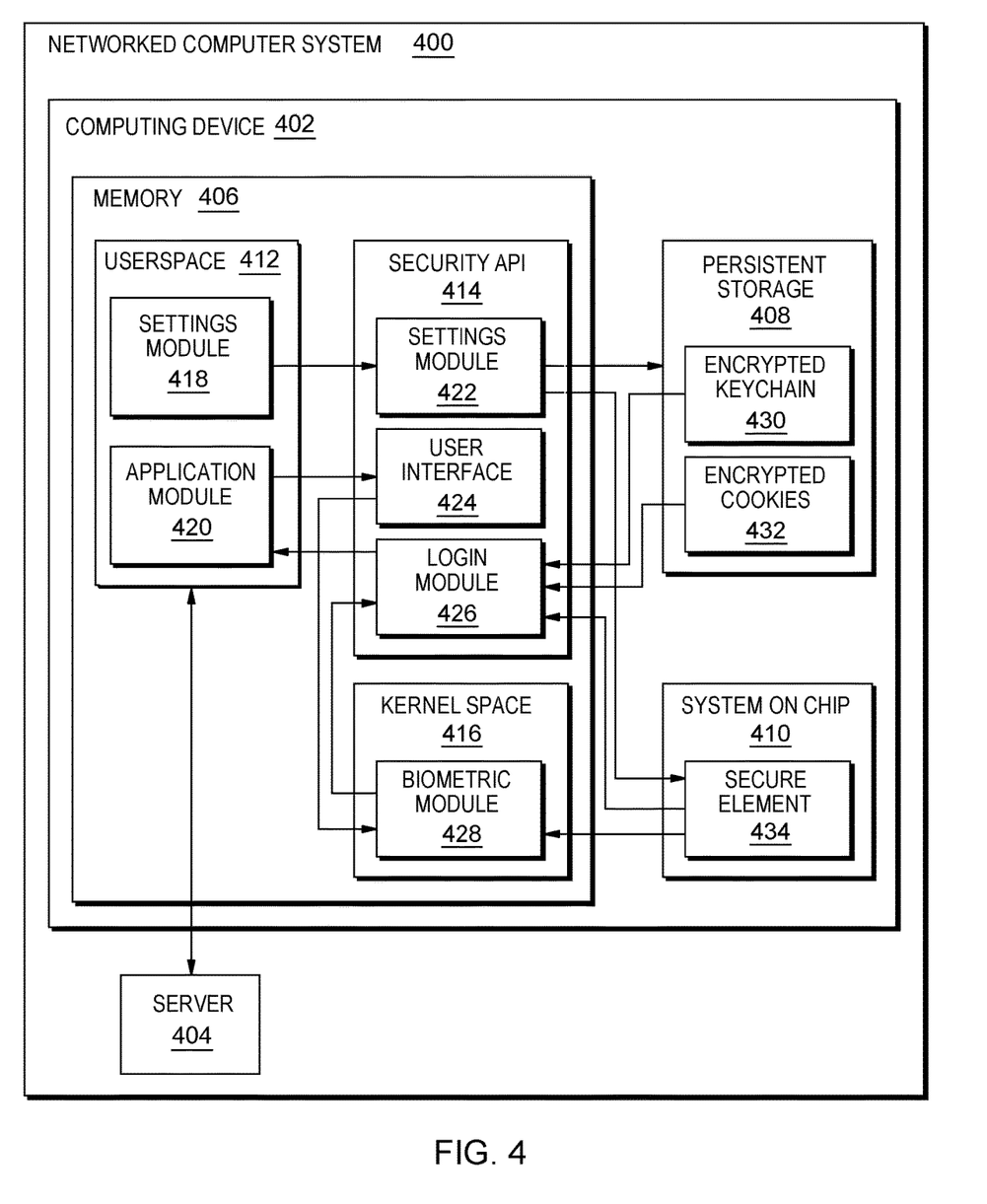
FIG. 4 is a block diagram view of a second embodiment of a system according to the present invention.
Figure 5:
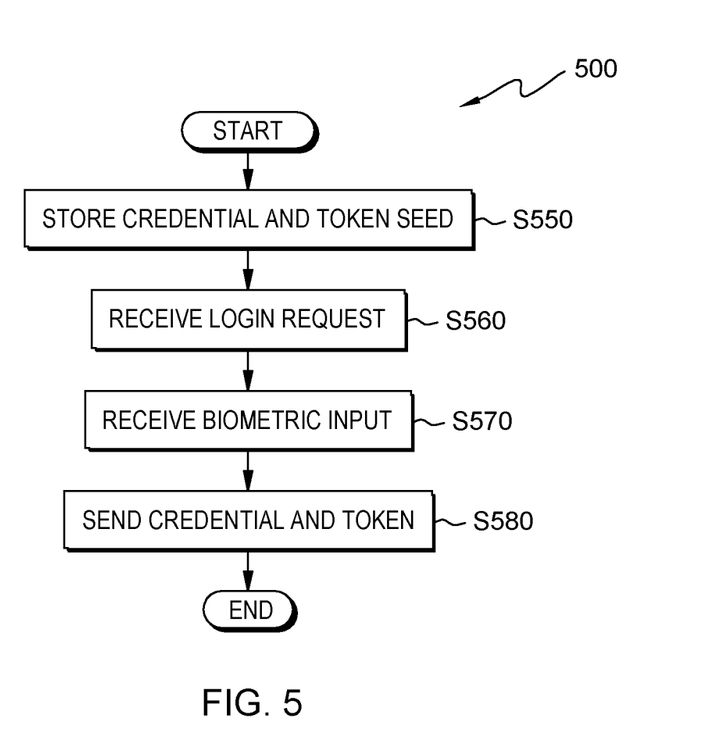
FIG. 5 is a flowchart showing a second embodiment method performed, at least in part, by the second embodiment system.

Further embodiments of the present invention are discussed in the paragraphs that follow with reference to FIG. 4-5.

FIG. 4 shows a block diagram depicting a second embodiment of a system according to the present invention. Networked computer system 400 includes computing device 402 and server 404. Computing device 402 and server 404 may communicate via a network (not shown).

Computing device 402 includes memory 406, persistent storage 408, and system on chip 410. Memory 406 includes userspace 412, security application programming interface (API) 414, and kernel space 416. Userspace 412 includes settings module 418 and application module 420. Security API 414 includes settings module 422, user interface module 424, and login module 426. Kernel space 416 includes biometric module 428.

Persistent storage 408 includes encrypted keychain 430 and encrypted cookies 432. System on chip 410 includes secure element 434.

In this embodiment, access permissions are restricted to increase security. Applications in userspace 412 may not directly access kernel space 416, encrypted keychain 430, or secure element 434. Modules in security API 414 must convey requested data between userspace 412 and kernel space 416, encrypted keychain 430, and secure element 434.

FIG. 5 shows flowchart 500 depicting a method according to the present invention. At least some of the method steps of flowchart 500 are performed by networked computer system 400. This method and associated software will now be discussed, over the course of the following paragraphs.

Processing begins at step S550, where settings module 422 stores a credential and a token seed. In this embodiment, settings module 418 receives a username and password credential, a token seed, and an account name from the user. Settings module 418 sends the credential, token seed, and account name to settings module 422, and settings module 422 stores the credential and account name in encrypted keychain 430 and stores the token seed in secure element 434. In this embodiment, settings module 422 receives biometric data from the user, and settings module 422 stores the biometric data in secure element 434.

Processing proceeds to step S560, where application module 420 receives a login request. In this embodiment, application module 420 receives a login request when a user attempts to access an account on server 404. Responsive to application module 420 receiving the login request, user interface module 424 identifies required authentication fields, such as username, password, token, and account name fields.

Processing proceeds to step S570, where biometric module 428 receives a biometric input from a user. In this embodiment, biometric module 428 may prompt the user for a biometric input, and biometric module 428 may receive a biometric input. Biometric module 428 compares the biometric input to the previously stored biometric data in secure element 434 to determine whether the biometric input is a valid match to the biometric data. Responsive to determining that the biometric input is a valid match, biometric module 428 requests the required authentication information from login module 426.

Processing proceeds to step S580, where login module 426 sends the credential and a token to application module 420. In this embodiment, login module 426 retrieves the previously stored username, password, and account name from encrypted keychain 430. Login module 426 retrieves a stored cookie from encrypted cookies 432. Login module 426 receives a token from secure element 434. In this particular embodiment, the token is generated by secure element 434 based, at least in part, on the previously stored token seed.

Some embodiments of the present invention may include one, or more, of the following features, characteristics and/or advantages: (i) storing an authentication program in secure storage; (ii) uses biometric input, including voice recognition, facial recognition, iris scanning, or retinal scanning for authentication; (iii) storing biometric data in persistent storage; (iv) storing biometric data, including previous inputs or characteristics; (v) uses a third party token generator application; (vi) the token generator is contained within a secure element; (vii) employs three or more authentication factors; (viii) does not concatenate authentication information to achieve a single-step sign-on; (ix) creates a single-step sign-on by abstracting the multiple steps to the user; (x) requires only the client-side device in use for the sign-on process; (xi) sending credentials and tokens together; and/or (xii) determining whether credentials and tokens are valid concurrently.

IV. DEFINITIONS

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein that are believed as maybe being new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

User/subscriber: includes, but is not necessarily limited to, the following: (i) a single individual human; (ii) an artificial intelligence entity with sufficient intelligence to act as a user or subscriber; and/or (iii) a group of related users or subscribers.

The terms "receive," "provide," "send," "input," "output," and "report" should not be taken to indicate or imply, unless otherwise explicitly specified: (i) any particular degree of directness with respect to the relationship between an object and a subject; and/or (ii) a presence or absence of a set of intermediate components, intermediate actions, and/or things interposed between an object and a subject.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

The phrase "without substantial human intervention" means a process that occurs automatically (often by operation of machine logic, such as software) with little or no human input. Some examples that involve "no substantial human intervention" include: (i) a computer is performing complex processing and a human switches the computer to an alternative power supply due to an outage of grid power so that processing continues uninterrupted; (ii) a computer is about to perform resource intensive processing and a human confirms that the resource-intensive processing should indeed be undertaken (in this case, the process of confirmation, considered in isolation, is with substantial human intervention, but the resource intensive processing does not include any substantial human intervention, notwithstanding the simple yes-no style confirmation required to be made by a human); and (iii) using machine logic, a computer has made a weighty decision (for example, a decision to ground all airplanes in anticipation of bad weather), but, before implementing the weighty decision the computer must obtain simple yes-no style confirmation from a human source.

"Automatically" means "without any human intervention."

Credential: any information used to authenticate a user including, but not limited to: usernames, passwords, and/or username password combinations.

Secure element: an isolated memory/execution environment, typically within a System-on-a-Chip (SoC), that is only accessible by the operating system.

Token: a non-sensitive equivalent substituted for a sensitive data element, typically a sequence of numbers and/or letters created by a token generator, based at least in part, on a token seed. A token is generally valid for a single use, and a new token must be generated for each subsequent request.

Token seed: a starting value from which tokens are generated.

Token generator: a program which generates tokens from a given token seed.

The invention claimed is:

1. A method for multifactor authentication, the method comprising:
   receiving, on a first computing device, a multifactor authentication request from a second computing device in response to the first computing device requesting access to a protected resource managed, at least in part, by the second computing device, the multifactor authentication request including a request for a first factor and a request for a second factor;
   prompting, on the first computing device, a user for a biometric input;
   responsive to authenticating the user based, at least in part, on the biometric input and biometric data stored by a secure element of the first computing device, the first computing device:
      sending a user credential to the second computing device in response to the request for the first factor;
      generating a single-use token using a token generator executing on the secure element, the token generator generating the single-use token based, at least in part, on a token seed stored by the secure element; and
      sending the single-use token to the second computing device in response to the request for the second factor;
   receiving, on the first computing device, an access status indicator in response to sending the user credential and the single-use token to the second computing device to access the protected resource;
   receiving, by a biometric module executed within a kernel space of the first computing device, the biometric input from the user and the biometric data stored by the secure element;
   comparing, by the biometric module executed within the kernel space of the first computing device, the biometric input to the received biometric data to determine whether the biometric input is a valid match to the biometric data; and
   responsive to the biometric module determining that the biometric input is a valid match to the biometric data, retrieving by a login module of a security application program interface (API) the user credential, the login module of the security API retrieving the single-use token from the secure element and providing the user credential and the single-use token to an application module of the first computing device.

2. The method of claim 1, further comprising:
   responsive to authenticating the user based, at least in part, on the biometric input and the biometric data stored by the secure element of the first computing device, retrieving the user credential from a storage device of the first computing device located outside of the secure element.

3. The method of claim 1, wherein:
   the application module executes logic within a user space of the first computing device to interface with the second computing device;
   the security API provides an interface between the application module executing within the user space of the first computing device and logic executing within the kernel space of the first computing device; and
   the security API provides an interface between the application module executing within the user space of the first computing device and the secure element such that logic executing within the user space cannot communicate directly with the secure element.

4. The method of claim 1, wherein the login module retrieves the user credential from a storage device of the first computing device located outside of the secure element.

5. The method of claim 1, wherein the security API includes one or more elements of an operating system kernel such that only the operating system kernel can access the secure element.

6. The method of claim 1, further comprising:
   automatically retrieving, by the login module of the security API, the user credential and the single-use token responsive to the biometric input authenticating the user such that the only user input required to access the protected resource via the multifactor authentication request is the biometric input.

7. The method of claim 6, wherein the biometric input from the user represents a single-step sign-on with respect to the protected resource managed by the second computing device.

8. The method of claim 1, wherein the secure element is implemented as a system on a chip (SoC).

* * * * *